Figure 3:
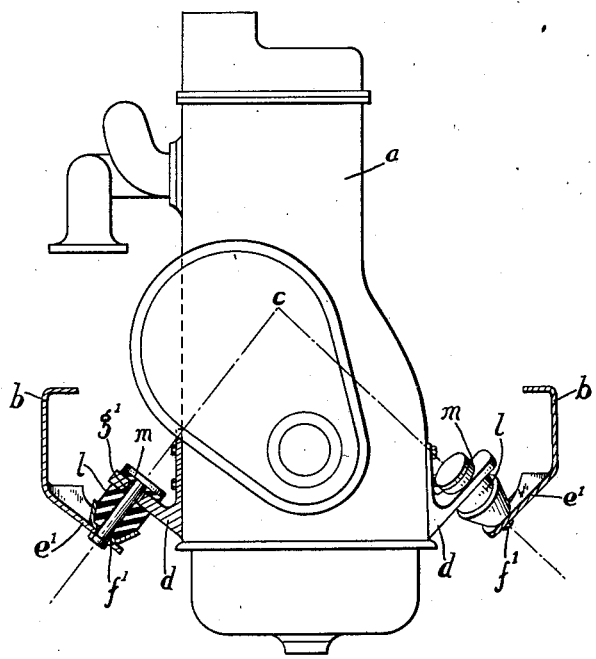

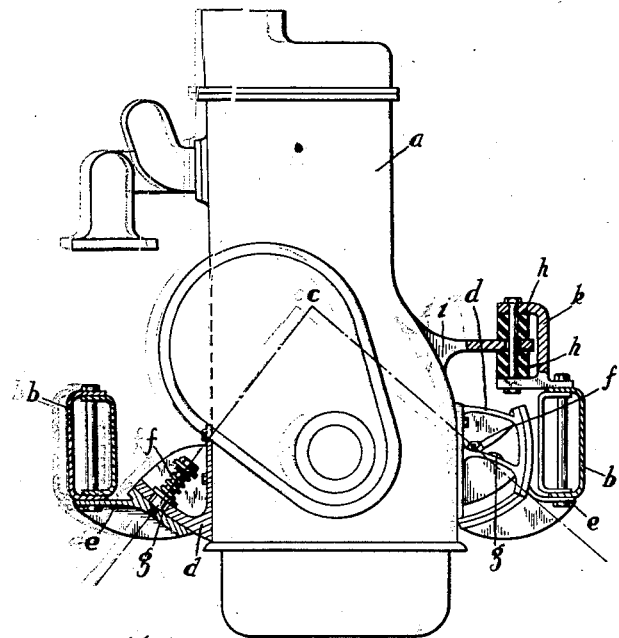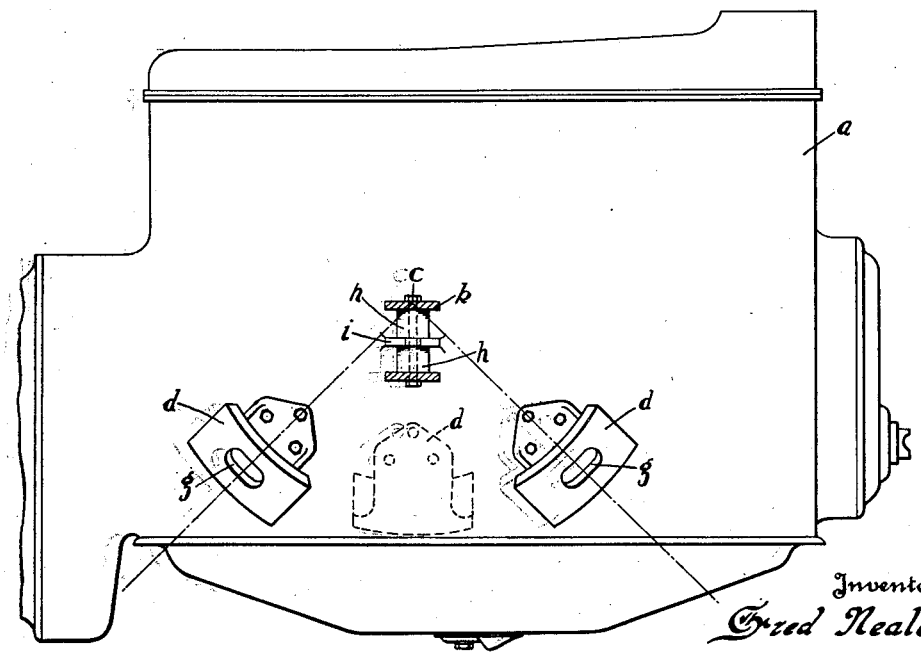

Oct. 6, 1936.   F. NEALE   2,056,733
SUSPENSION OF MACHINERY SUBJECT TO VIBRATION
Filed March 3, 1933   3 Sheets-Sheet 2

Oct. 6, 1936.  F. NEALE  2,056,733

SUSPENSION OF MACHINERY SUBJECT TO VIBRATION

Filed March 3, 1933  3 Sheets-Sheet 3

Inventor
Fred Neale
By Blackmore, Spence & Fliux
Attorneys

Patented Oct. 6, 1936

2,056,733

UNITED STATES PATENT OFFICE 2,056,733

SUSPENSION OF MACHINERY SUBJECT TO VIBRATION

Fred Neale, Coventry, England, assignor to General Motors Corporation, Detroit, Mich., a corporation of Delaware Application March 3, 1933, Serial No. 659,463
In Great Britain March 29, 1932

16 Claims. (Cl. 248—7)

This invention relates to the suspension of machinery of the kind in which, as in the case of the power or transmission units of an automobile, forces are actively at work tending to cause vibration and/or displacement of said unit.

It is known that disturbances of the kind referred to are produced by such forces as inertia of reciprocating parts, torque reaction, rotary unbalance and the like and are of various magnitudes and act in various planes, and a number of different systems and devices have already been proposed to eliminate or reduce them. It has been suggested for example, to introduce non-metallic material, such as India rubber, between rigid supporting arms on the unit and housings on the supporting structure. In one of these cases stress is laid on the fact that the means employed to connect the housings to said structure are independent of and without interengagement with the non-metallic material and said arms. In another case the rubber block is gripped between and fits closely within oppositely arranged recesses on the attachment device and the supporting member respectively.

Apparatus for supporting a machine unit to minimize transmitted vibration has also been proposed comprising means upon which the machine unit is mounted permitting resiliently restrained three degree angular motion of the machine unit about a single point but positively restraining the same against translatory motion along any of three mutually perpendicular axes. I am also aware that in connection with the power unit of a motor vehicle, means have been proposed to absorb vibration by permitting restrained motion of the unit around a single axis containing the center of gravity of the unit. In one such case the unit is arranged to rock on resilient supports around a fore and aft axis which passes through the center of gravity of the unit, in conjunction with restraining means independent of the means employed to take the weight of the unit. In another case the suspended unit is mounted so as to be free to rock under restraint about an axis which is transverse relatively to the axis of the crank-shaft and passes through the center of gravity of the unit.

A system of suspension for a power or transmission unit according to this invention is distinguished from those above described in that the suspended unit is permitted under restraint to turn about its center of gravity on any axis and may also be capable of a movement of translation under restraint along any one or more of three mutually perpendicular axes. If desired the restraining means may, in either or both cases, be arranged so as to be independent of the means employed to sustain the weight of the unit.

Figure 4:
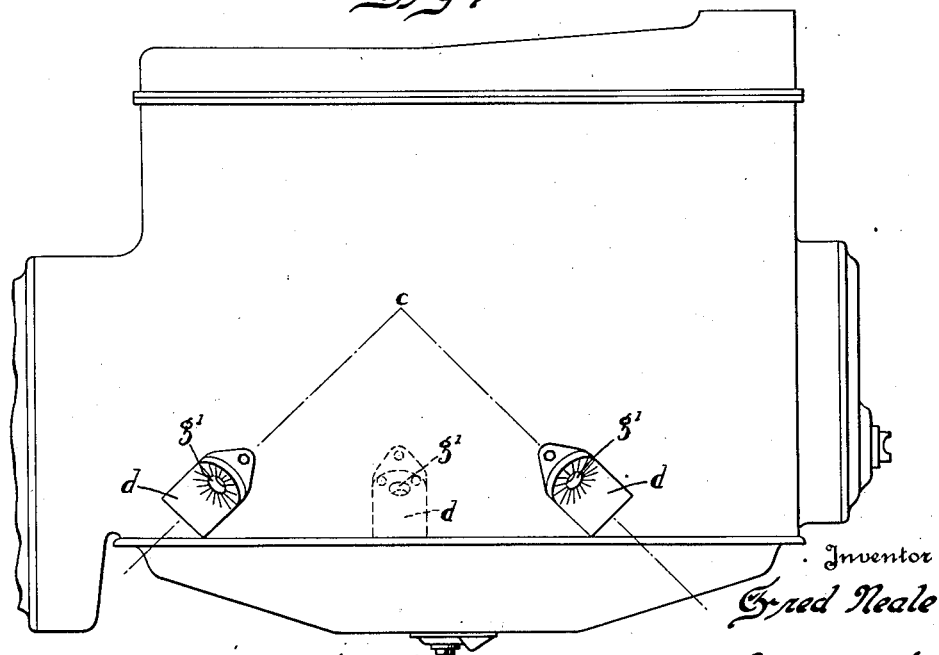
Figure 5:
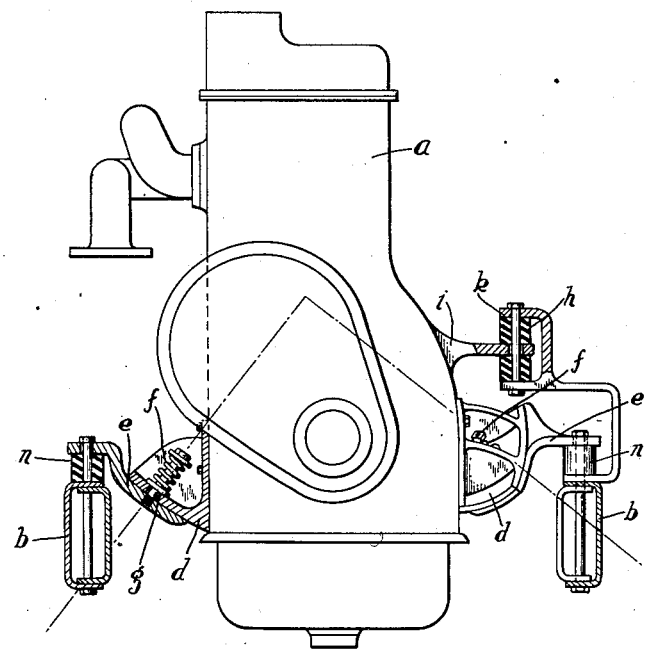
Figure 6:
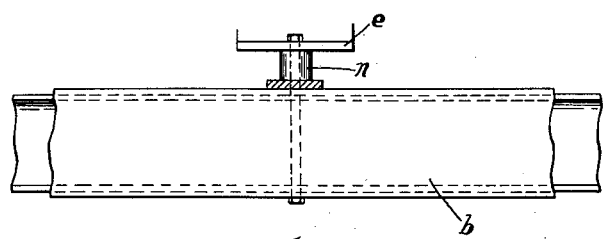

In order that the invention may be clearly understood and readily carried into practical effect, reference is made in the following description to the accompanying drawings, in which Figures 1 and 2 are end and side views respectively of a power unit suspended in accordance with one way of carrying out the present invention; Figures 3 and 4 are similar views respectively illustrating an alternative form of suspension; Figure 5 is an end view of the unit illustrating a further modification of the invention; Figure 6 is a detail side view further illustrating the method of attaching the unit supports to the frame, according to Figure 5.

Referring to the drawings, $a$ represents the power unit and $b$, $b$ the frame members of a motor vehicle.

In the arrangement shown in Figures 1 and 2 the means whereby the suspended unit $a$ is permitted within the limits of restraint to rotate about its center of gravity $c$ on any axis involves the provision of one or more seating projections $d$, $d$ rigidly associated with the power unit and one or more supports $e$, $e$ attached to the chassis frame members $b$, $b$ the bearing surface or surfaces of said projection and support or of each of said projections and supports forming part of a sphere having for its center the center of gravity $c$ of the power unit. The said surfaces need not necessarily all form part of the same sphere since some of them may be more conveniently arranged at different radii from the center of gravity.

Spherical contact between the said power unit projections and their supports may be maintained by spring loaded bolts $f$, $f$ carried by the latter and projecting through slots $g$, $g$ in the former so as to permit of the desired freedom of rotation of the power unit around its center of gravity $c$. Restraint of such rotation may be provided by means of springs arranged between the said projections and their supports, or, as shown, by means of rubber blocks $h$, $h$ arranged between a rigid arm $i$ on the unit and a bracket $k$ fixed to the frame member.

Although only one of these restraining devices is shown in Figure 1, it is to be understood that there may be any number of them arranged to restrain rotation of the unit about the center of gravity on any axis.

It will be observed that in the arrangement above described the restraining means are entirely independent of the means which sustain the weight of the power unit viz: the projections d, d and the supports e, e.

Alternatively, as shown in Figures 3 and 4, the restraining means may be incorporated with the weight carrying means. For example, blocks l, l of a resiliently yielding material, such as India rubber, may be interposed between the projections d, d on the power unit a and their supports $e^1$, $e^1$ which in this case may, as shown, form integral parts of the frame members b, b. The connections between these supports and the unit is by means of bolts $f^1$, $f^1$ protruding through slots $g^1$, $g^1$ in the projections d, d the axes of the bolts passing through the center of gravity c of the unit, and the whole mounting being such as to permit of the desired freedom of rotation of the power unit about any axis through its center of gravity c within the limits of restraint imposed by the flexing of the rubber blocks. The resiliency of the rubber may, if desired be different in different supports to satisfactorily absorb vibrations arising from the various disturbing forces. Supplementary rubber blocks m, m are preferably introduced between the heads of the bolts and the projections d, d.

The present invention also provides means whereby in addition to its restrained rotation about any axis through its center of gravity the power unit may be permitted to move bodily along any one, two or all of three mutually perpendicular axes under suitable restraint. As shown in Figures 5 and 6 such means may be provided with the type embodying the spring controlled power unit rotation about its center of gravity as shown in Figures 1 and 2, by the interposition of springs or blocks n, n of resiliently yielding material between the chassis frame members b, b and the power unit supports e, e to permit of restrained movement of the power unit along any desired axis, while stops may be provided to positively restrain the power unit supports from movement relatively to the chassis frame along the axis or axes in which such movement is not desired.

Alternatively, restrained movements of the power unit along certain desired axes are controlled by the resilient blocks controlling the rotation of the power unit around its center of gravity, as in Figures 3 and 4, and additional suitably placed springs or blocks of resiliently yielding material may be interposed between the said power unit supports and the chassis frame, or parts associated therewith, to permit of restrained movement of the power unit along any axis or axes as desired, while the said power unit supports may be positively restrained by stops from movement relatively to the chassis frame along the axis or axes in which such movement is not desired.

Having now particularly described and ascertained the nature of my said invention, and in what manner the same is to be performed, I declare that what I claim is:

1. In the mounting in a chassis frame of an engine having moving parts and having as an incident to the movement of said parts an inherent vibration around its center of gravity, weight supporting means including relatively movable members associated with the chassis frame and engine respectively, and cooperating bearing surfaces on said members slidably engaging each other so related to the center of gravity of the engine to accommodate by their relative movement, the vibration of the engine about any axis through its center of gravity.

2. In a motor vehicle, a chassis frame, an engine having operating parts and being subject to inherent vibration about its center of gravity upon operation of said parts, and means to mount said engine in the chassis frame, including a pair of mating members having cooperating bearing surfaces extending in planes substantially tangent to a circle whose center is on the center of gravity of the engine and means movably connecting said members for relative movement of the bearing surfaces to accommodate vibrations of the engine in any direction around its center of gravity.

3. In the mounting on a support of an engine subject to inherent vibration as an incident to its operation, a weight supporting connection between the engine and support, including opposed surfaces mating one with another and substantially defining spherical portions struck from a center approximately coinciding with the engine center of gravity, to accommodate by their relative movement vibratory movements of the engine about any axis through its center of gravity.

4. In the mounting on a support of an engine subject to inherent vibration as an incident to its operation, a weight supporting connection between the engine and support, including opposed surfaces mating one with another and substantially defining spherical portions struck from a center approximately coinciding with the engine center of gravity, to accommodate by their relative movement vibratory movements of the engine about any axis through its center of gravity and a resilient element interposed between said surfaces.

5. In combination with an internal combustion engine which has a tendency to oscillate around its center of gravity in response to vibratory forces resulting from engine operation of means movably mounting said engine, including a plurality of supports, each having a bearing surface extending substantially in a general direction perpendicular to lines drawn from the center of gravity to points on said surface, and a resilient element associated with said bearing surface to accommodate its movement about any axis through the center of gravity of the engine under resilient restraint.

6. Means to mount an engine for turning movement about any axis through its center of gravity in response to vibratory forces generated upon engine operation, including three points of support for the engine, each of which involves a pair of cooperating and relatively movable mating surfaces which extend in planes substantially tangent to a circle whose center is the center of gravity of the engine, elastic deformable material between said surfaces, and stabilizing means for restraining the movement of the engine on its supports.

7. In combination, a frame, a piston engine having a crank shaft and being subject to vibratory forces upon operation which tend to oscillate the engine about a plurality of axes all intersecting its center of gravity, weight supporting means adapted to carry the entire weight of the engine, including a pair of opposed surfaces associated with the engine and frame respectively and disposed in planes substantially normal to a line drawn therefrom through said center of gravity, together with elastic deformable material between the surfaces to yieldingly resist their relative movement in said planes, and resilient connections between the frame and engine independent of said weight supporting means.

8. The combination with a support and a supported body including a piston engine having moving parts which upon operation tend to oscillate the body about its center of gravity first on one axis and then on another axis, of weight supporting means between the support and body, including a pair of resilient elements extending in tangential relation to a circle whose center is the center of gravity to accommodate said oscillations about any axis intersecting the center of gravity under resilient restraint, and means to stabilize the body on said weight supporting means.

9. The combination with a piston engine having a tendency upon operation to oscillate about a shiftable axis that always intersects the engine center of gravity and a support therefor, of means to mount the engine in the support including bearing surfaces on the engine and support respectively extending substantially in directions defining arcs struck from said center of gravity and carrying substantially the entire weight of the engine while permitting relative movement between said surfaces in all directions about the center of gravity, and a stabilizing connection between the engine and support.

10. In a motor vehicle, a chassis frame, a power plant having moving parts, the operation of which tends to vibrate the power plant about one axis under certain conditions and about a different axis under other conditions, said axes intersecting each other at the power plant center of mass, supporting connections on the power plant and chassis frame respectively and provided with mating bearing surfaces defining spherical segments struck from the point of intersection of said axes at the center of mass.

11. The combination with a chassis frame and an internal combustion engine, the operation of which generates vibrations of the engine, of means to movably mount the engine in the chassis frame including a plurality of connections between the frame and engine, each embodying mating bearing members defining spherical segments struck from the engine center of mass and accommodating by their relative movement the oscillations of the engine about its center of mass and additional means associated with one of said members to permit the engine a movement of translation.

12. The combination of a frame, a power plant unit including an internal combustion engine having a plurality of cylinders distributed longitudinally of the engine shaft, and a mounting for said unit comprising a plurality of members carried by the frame and engaged by said unit, said members being of such character and so located with reference to the center mass of the unit that the several axes of oscillation of said unit pass substantially through the center of mass thereof and the unit is permitted a limited oscillation about any such axes only, at least one of said members being resilient.

13. The combination of a frame, a power plant unit including an internal combustion engine and a crank shaft, the center of mass of said unit being located above the axis of the crank shaft, and a mounting for said unit comprising a plurality of rubber elements carried by the frame and engaged by said unit, said elements being so formed and located with reference to the center of mass as to mount said unit for oscillation only about a plurality of axes all passing substantially through the center of mass of said unit.

14. The combination of a supporting structure, a power plant unit including an internal combustion engine having a plurality of cylinders distributed longitudinally of the engine shaft, and a plurality of members interposed between said supporting structure and unit, said members being of such character and so located with reference to the center of mass of the unit as to provide a plurality of axes of oscillation for said unit all passing substantially through the center of mass thereof and to permit oscillation about only the several axes.

15. The combination of a frame, a power plant including an internal combustion engine and a crank shaft, the center of mass of said unit being located above the axis of the crank shaft, a mounting for said unit comprising a plurality of members carried by the frame and engaged by said unit, said members being of such character and so located that the engine has oscillations only about the axes which pass substantially through the center of mass of said unit, and means resiliently opposing angular displacement of the unit about the several axes.

16. In a motor vehicle, a chassis frame, an internal combustion engine having a plurality of cylinders distributed longitudinally of the engine shaft and tending upon operation to oscillate about several axes individually under different conditions of speed and load, all of which axes intersect at a common point above the engine shaft and longitudinally intermediate the endmost cylinders, and a mounting for said engine comprising cooperating members associated with the frame and engine and so constructed and arranged with reference to said common point of intersection of the axes as to provide for oscillation of the engine about only such axes which pass substantially through said common point and to constrain engine oscillations to movements about such axes.

FRED NEALE.